United States Patent [19]

Lu

[11] Patent Number: 5,776,618
[45] Date of Patent: Jul. 7, 1998

[54] BARRIER FILM STRUCTURES

[75] Inventor: Pang-Chia Lu, Pittsford, N.Y.

[73] Assignee: Mobil Oil Corporation, Fairfax, Va.

[21] Appl. No.: 686,305

[22] Filed: Jul. 25, 1996

[51] Int. Cl.$^6$ .............................. B32B 27/28; B32B 27/32
[52] U.S. Cl. ........................ 428/500; 428/35.4; 428/516
[58] Field of Search .................... 428/500, 524, 428/522, 35.4; 525/57, 68, 60, 61; 485/516, 515

[56] References Cited

U.S. PATENT DOCUMENTS

| | | | |
|---|---|---|---|
| 2,130,212 | 9/1938 | Watkins | 525/56 |
| 2,333,796 | 11/1943 | Kenyon et al. | 525/56 |
| 2,362,026 | 11/1944 | Quist | 524/255 |
| 2,419,281 | 4/1947 | Nobil | 524/236 |
| 2,897,092 | 7/1959 | Miller | 428/516 |
| 2,916,468 | 12/1959 | Yundt | 524/503 |
| 3,033,842 | 5/1962 | Holtschmidt | 525/61 |
| 3,099,646 | 7/1963 | Scardiglia et al. | 525/61 |
| 3,221,079 | 11/1965 | Harris | 525/58 |
| 3,232,916 | 2/1966 | Fogle | 525/56 |
| 3,275,575 | 9/1966 | Fogle | 521/27 |
| 3,282,729 | 11/1966 | Richardson | 428/506 |
| 3,294,577 | 12/1966 | Mayer | 428/502 |
| 3,518,242 | 6/1970 | Chrisp | 525/61 |
| 3,702,844 | 11/1972 | Ofstead et al. | 428/511 |
| 3,719,621 | 3/1973 | Vogt et al. | 524/390 |
| 4,154,912 | 5/1979 | Philipp et al. | 525/56 |
| 4,214,039 | 7/1980 | Steiner et al. | 428/414 |
| 4,224,262 | 9/1980 | Baird, Jr. et al. | 264/470 |
| 4,235,365 | 11/1980 | Yoshii et al. | 229/55 |
| 4,240,993 | 12/1980 | Sun | 264/22 |
| 4,254,169 | 3/1981 | Schroeder | 428/35 |
| 4,262,067 | 4/1981 | Phillipp et al. | 429/139 |
| 4,272,470 | 6/1981 | Hsu et al. | 264/104 |
| 4,275,119 | 6/1981 | Weiner | 428/516 |
| 4,276,330 | 6/1981 | Stanley et al. | 428/35 |
| 4,277,572 | 7/1981 | Fujiwara et al. | 525/61 |
| 4,284,671 | 8/1981 | Cancio et al. | 428/35 |
| 4,288,477 | 9/1981 | Bordini et al. | 428/35 |
| 4,357,402 | 11/1982 | Sheibley et al. | 429/206 |
| 4,376,183 | 3/1983 | Haskell | 524/417 |
| 4,416,938 | 11/1983 | Haskell | 428/289 |
| 4,439,493 | 3/1984 | Hein et al. | 428/414 |
| 4,475,241 | 10/1984 | Mueller et al. | 383/113 |
| 4,564,559 | 1/1986 | Wagner, Jr. et al. | 428/349 |
| 4,650,721 | 3/1987 | Ashcraft | 428/516 |
| 4,725,646 | 2/1988 | Kobashi et al. | 525/61 |
| 4,731,266 | 3/1988 | Bonnebat et al. | 428/35 |
| 4,785,049 | 11/1988 | Balaba et al. | 525/61 |
| 4,927,689 | 5/1990 | Markiewicz | 428/34.8 |
| 5,102,699 | 4/1992 | Beeson et al. | 427/379 |
| 5,230,963 | 7/1993 | Knoerzer | 428/520 |
| 5,281,307 | 1/1994 | Smigo et al. | 162/164.3 |
| 5,300,566 | 4/1994 | Pinschmidt, Jr. et al. | 525/60 |
| 5,330,831 | 7/1994 | Knoerzer et al. | 428/353 |
| 5,380,586 | 1/1995 | Knoerzer et al. | 428/349 |
| 5,552,002 | 9/1996 | Farrell et al. | 156/82 |
| 5,629,084 | 5/1997 | Moya | 428/315.7 |

FOREIGN PATENT DOCUMENTS 0 644 247 A2  3/1995  European Pat. Off. .

OTHER PUBLICATIONS

T.W. Modi, *Polyvinyl Alcohol*, in Handbook of Water-Soluble Gums and Resins 20.1–20.32 (Robert L. Davidson ed., 1980).

Harold L. Jaffee and Franklin M. Rosenblum, *Poly(Vinyl Alcohol) for Adhesives*, in Handbook of Adhesives 401–407 (Irving Skeist ed., 1990).

Primary Examiner—Paul J. Thibodeau
Assistant Examiner—D. Lawrence Tarazano
Attorney, Agent, or Firm—Dennis P. Santini

[57] ABSTRACT

A polymeric film structure exhibiting improved barrier properties and which is formed in the absence of a primer. The film structure is produced by coating a surface of a polymeric substrate with a solution of a polyvinyl alcohol-vinyl amine copolymer, an aldehyde-containing crosslinking agent and a crosslinking promoting acid catalyst. The polymer substrate is made out of polyolefin materials such as polypropylene.

12 Claims, No Drawings

BARRIER FILM STRUCTURES

BACKGROUND OF THE INVENTION

The present invention relates to barrier film structures and, more particularly, to polymeric films having PVOH-based coatings adhered thereto for improved barrier properties.

Polymeric film structures are used in many commercial applications. One particularly important application is the food packaging industry. Film structures employed in the food packaging industry are chosen and/or designed to provide characteristics necessary for proper food containment. Such characteristics include water vapor barrier properties, oxygen and gas barrier properties and flavor and aroma barrier properties. One commonly employed structure includes a flexible and durable polymeric film substrate that provides the film structure with structural integrity and water vapor barrier properties, and at least one coating adhered thereto that provides the film structure with oxygen, gas barrier and flavor aroma barrier properties.

For example, coatings of polyvinyl alcohol ("PVOH") are known to provide a barrier to the transmission of oxygen, and have been applied to various polymeric substrates in the past. PVOH, however, is soluble in water and is therefore susceptible to attack by moisture. In this regard, various attempts have been made to decrease the sensitivity of PVOH to attack by moisture.

One known method of decreasing the sensitivity of a PVOH-based coating to attack by moisture involves the crosslinking of the PVOH. That is, a crosslinking agent and catalyst may be applied along with the PVOH such that the agent interconnects and thereby crosslinks the PVOH molecules as such coating is dried. The crosslinked coating thereafter exhibits increased resistance to attack by moisture as compared to non-crosslinked coatings. As mentioned, a catalyst is typically added to the coating solution to facilitate the crosslinking process.

To ensure adequate bonding between a PVOH-based coating and the underlying substrate, the prior art typically employs a primer. More particularly, a primer, e.g., polyethyleneimine, is applied to the substrate prior to the application of the PVOH-based coating. The use of primers, however, is not without its disadvantages. For example, the use of a primer increases the number of manufacturing steps and also increases the manufacturing cost of producing the film structure. Moreover, applications may exist in which the presence of a primer in the film structure may negatively impact or limit the use of such structure.

The prior art has attempted to apply PVOH-based coatings to polymeric substrates in the absence of a primer. These attempts have included efforts to modify the surface of the underlying substrate by, for example, the blending of various components such as maleic acid anhydride therein. Commonly-owned U.S. Pat. No. 4,650,721 discloses a film structure in which a coating of PVOH is applied to a maleic acid anhydride-modified polypropylene substrate and thereafter oriented to affect adhesion therebetween. However, the use of modified polymeric substrates is again not without its disadvantages. The modification of the substrate increases the number of manufacturing steps and/or increases the manufacturing cost of producing the film structure. Moreover, the modification of the polymeric substrate may negatively impact other film characteristics such as machinability, processsability and clarity.

There is therefore a need in the art for a barrier film structure which is formed by the application of a PVOH-based coating to a surface of a polymeric substrate in the absence of a primer and/or use of a modified substrate. In this regard, the PVOH-based coating should adhere firmly to the surface of the underlying substrate, while exhibiting improved barrier properties and improved rubbing resistance.

SUMMARY OF THE INVENTION

The present invention, which addresses the need in the art, relates to a polymeric film structure having improved barrier characteristics. The film structure is produced by the process of coating at least one side of a polymeric substrate with a solution of a polyvinyl alcohol-vinyl amine copolymer, an aldehyde-containing crosslinking agent in an amount sufficient to effect crosslinking throughout said copolymer and a catalytically-effective amount of a crosslinking-promoting acid catalyst.

In one preferred embodiment, the copolymer includes from about 2% to about 20% of vinyl amine, and preferably about 6% to about 12% of vinyl amine. The aldehyde-containing crosslinking agent is preferably selected from the group consisting of melamine formaldehyde, urea formaldehyde and glyoxal. The crosslinking-promoting acid catalyst is preferably selected from the group consisting of hydrochloric acid, sulfuric acid, phosphoric acid and acetic acid. Finally, the coating solution is preferably coated on the surface of an unmodified polymeric substrate in the absence of a primer layer therebetween.

As a result, the present invention provides a barrier film structure which is formed by the application of a PVOH-based coating to a surface of a polymeric substrate in the absence of a primer layer therebetween and in the absence of the use of a modified polymeric substrate. The PVOH-based coating firmly adheres to the surface of the underlying substrate, even in the absence of the primer and/or resin modifier. The PVOH-based coating exhibits a high degree of crosslinking upon drying. Moreover, the crosslinked coating exhibits excellent barrier properties and resistance to rubbing.

DETAILED DESCRIPTION OF THE INVENTION

The films of the present invention are produced by coating at least one side of a polymeric substrate with a solution of a polyvinyl alcohol-vinyl amine copolymer, an aldehyde-containing crosslinking agent in an amount sufficient to effect crosslinking throughout the polyvinyl alcohol-vinyl amine and a catalytically-effective amount of a crosslinking-promoting acid catalyst. The polyvinyl alcohol-vinyl amine copolymer is thereafter crosslinked to provide an oxygen barrier, i.e., a polymeric layer which resists the transmission of oxygen therethrough.

The improved oxygen barrier layer of the present invention may be adhered to any number of polymeric substrates. The oxygen barrier layer is preferably adhered to polymeric films formed from polyolefins. One particularly preferred polyolefin is polypropylene.

It has been discovered herein that a coating solution of polyvinyl alcohol-vinyl amine copolymer and an aldehyde-containing crosslinking agent in the presence of a catalytically-effective amount of a crosslinking-promoting acid catalyst will adhere to an underlying polymeric substrate in the absence of a primer layer therebetween and without the use of a modified polymeric substrate. Stated differently, the need for precoating the surface of the underlying substrate with any of the various known primers (e.g., polyethyleneimine (PEI)) has been eliminated in the present invention. Moreover, this may be accomplished with an unmodified polymeric substrate, i.e., a substrate formed from a polymer which has not been modified by the blending of various components therein in an effort to improve the surface bonding characteristics of the resultant extruded film.

Thus, the aforementioned PVOH-based coating solution may be applied directly to a surface of an unmodified polymeric substrate. This then eliminates the additional manufacturing steps required in the prior art, thus reducing the manufacturing cost of the film structure. Moreover, the removal of the primer and/or modifier components from the film structure allows such structure to be used in a greater variety of applications, while also permitting greater manufacturing flexibility.

The polyvinyl alcohol-vinyl amine copolymer includes from about 2% to about 20% of vinyl amine, and preferably includes about 6% to about 12% of vinyl amine. Polyvinyl alcohol-vinyl amine, including at least one preferred method of manufacture, is discussed in U.S. Pat. No. 5,300,566, assigned to Air Products and Chemical Company.

Although PVOH-based coatings provide a barrier to the transmission of oxygen, PVOH itself is soluble in water and therefore susceptible to attack by moisture. As a result, PVOH layers which will be exposed to moisture are typically crosslinked. The crosslinking of the PVOH layer substantially reduces its susceptibility to attack by moisture.

In the present invention, an aldehyde-containing crosslinking agent in an amount sufficient to effect crosslinking throughout the polyvinyl alcohol-vinyl amine copolymer is added to the coating solution. The crosslinking agent is preferably selected from the following agents: melamine formaldehyde, urea formaldehyde, glyoxal and agents derived therefrom. The melamine formaldehydes are particularly preferred crosslinking agents. Commercially available melamine formaldehyde crosslinking agents include Cymel 303, Cymel 350, Cymel 373, Parez 613, Parez 617 and Parez 707, available from American Cyanamid Co.

To promote and facilitate the crosslinking of the polyvinyl alcohol-vinyl amine copolymer, a catalytically-effective amount of a crosslinking-promoting acid catalyst is added to the coating solution. The acid catalyst is preferably selected from the following acids: hydrochloric acid (HCL), sulfuric acid ($H_2SO_4$), phosphoric acid ($H_3PO_4$) and acetic acid ($CH_3COOH$). The pH of the coating solution is preferably maintained within the range of from about 1 to about 6, and more preferably at a pH of about 2 to about 4.

The coating solution includes from about 60% to about 95% of the polyvinyl alcohol-vinyl amine copolymer, and more preferably from about 70% to about 80% of the polyvinyl alcohol-vinyl amine copolymer. The coating solution further includes from about 2% to about 40% of the aldehyde-containing crosslinking agent, and more preferably from about 15% to about 30% of the aldehyde-containing crosslinking agent. Finally, the coating solution includes from about 0.1% to about 10% of the crosslinking-promoting acid catalyst, and more particularly from about 0.5% to about 5% of the crosslinking-promoting acid catalyst.

The solution, which is preferably aqueous, is prepared by mixing the polyvinyl alcohol-vinyl amine copolymer with the aldehyde-containing crosslinking agent in a water solution. Thereafter, the acid catalyst is added in an amount sufficient to adjust the pH to about 1-6, and preferably to about 2-4.

In one preferred embodiment, the aqueous solution includes from about 3% to about 20% by weight of solid and, more preferably, from about 5% to about 10% by weight of solid.

The side of the substrate to be coated is preferably surface treated in a conventional manner, e.g., by flame treatment, corona treatment, or other similar treatment. In one particular preferred embodiment, the surface of the substrate to be coated is corona treated such that the surface exhibits a surface tension of from about 35 dynes to about 45 dynes and, more preferably, about 38 dynes.

Finally, the PVOH-based coating of the present invention allows the application of a top coating thereover. For example, an acrylic heat seal coating may be applied to the exposed surface of the PVOH-based coating.

The following examples illustrate the enhanced barrier characteristics of films produced in accordance with the present invention.

EXAMPLE

Samples 1a to 1e were produced as described hereinbelow and measured for % crosslinking (after 1 hr. off line) and $TO_2$ (cc/100 $in^2$/24 hr. @ 100° F. and 90% RH) and set forth hereinbelow.

The polymeric substrate used in each of Samples 1a–1e was an oriented polypropylene film having a thickness of 1 mil. The polypropylene substrate was corona treated whereby the treated surface exhibited a surface energy of 38 dynes.

Samples 1a–1c employed a polyethyleneimine primer, while Samples 1d–1e were produced in the absence of a primer in accordance with the present invention.

The coating solutions were aqueous solutions of PVOH (ELVANOL 7130) or PVOH/V Am (6% V Am) as identified below, melamine formaldehyde (Parez 707) in the amount identified below and a phosphoric acid catalyst ($H_3PO_4$) in an amount effective to adjust the pH of the coating solution to approximately 2.5. The coating solutions were applied at a coating weight of 0.4 g/msi.

| Sample | Primer | Coating | X-linking (% after 1 hour) | $TO_2$ (cc/100 $in^2$/24 hr. @ 100° F. and 90% RH) |
|---|---|---|---|---|
| 1a | PEI | PVOH + 22 pts X-linker | 90 | 0.018 |
| 1b | PEI | PVOH/VAm + 22 pts X-linker | 98 | 0.022 |
| 1c | PEI | PVOH/VAm + 30 pts X-linker | 99 | 0.019 |
| 1d | None | PVOH/VAm + 22 pts X-linker | 90 | 0.079 |
| 1e | None | PVOH/Vam + 30 pts X-linker | 98 | 0.021 |

As is readily apparent from the data set forth in the above table, Sample 1e formed in accordance with the present invention exhibits excellent oxygen barrier properties. These properties are comparable to the barrier properties achieved in the prior art film structures (e.g., Sample 1a), but are achieved in a film structure which does not employ a primer layer between the surface of the substrate and the PVOH-based coating and does not require the use of modified polymeric substrate. The PVOH-based coating of Sample 1e adheres firmly to the underlying substrate as measured by wet rubbing of the coated film structures. Moreover, the film structure of Sample 1e exhibits a high degree of crosslinking (98% after 1 hr.), thus reducing the drying and/or storage time required to achieve maximum crosslinking.

Thus, while there have been described what are presently believed to be the preferred embodiments of the invention, those skilled in the art will realize that various changes and modifications may be made to the invention without departing from the spirit of such invention. All such changes and modifications which fall within the scope of the invention are therefore intended to be claimed.

What is claimed is:

1. A polymeric film structure produced by the process comprising:

coating at least one side of a polyolefinic substrate with a solution of a polyvinyl alcohol-vinyl amine copolymer, an aldehyde-containing crosslinking agent for crosslinking said copolymer and a catalytically-effective amount of a crosslinking-promoting acid catalyst.

2. The film structure according to claim 1, wherein said copolymer includes from about 2% to about 20% by weight of vinyl amine.

3. The film structure according to claim 2, wherein said copolymer includes about 6% to about 12% by weight of vinyl amine.

4. The film structure according to claim 1, wherein said aldehyde-containing crosslinking agent is selected from the group consisting of melamine formaldehyde, urea formaldehyde and glyoxal.

5. The film structure according to claim 1, wherein said crosslinking-promoting acid catalyst is selected from the group consisting of hydrochloric acid, sulfuric acid, phosphoric acid and acetic acid.

6. The film structure according to claim 1, wherein said solution has a pH level of from about 2 to about 4.

7. The film structure according to claim 1, wherein said solution is coated on said substrate in the absence of a primer.

8. The film structure according to claim 1, wherein said solution is aqueous.

9. The film structure according to claim 1, wherein said solution includes from about 70% to about 80% by weight of said copolymer, from about 15% to about 30% by weight of said crosslinking agent and from about 0.5% to about 5% by weight of said acid catalyst.

10. The film structure according to claim 1, wherein said at least one side of said polymeric substrate is subjected to a surface treating process selected from the group consisting of corona discharge and flame treatment.

11. The film structure according to claim 10, wherein said surface treated side exhibits a surface energy of from about 35 to about 45 dynes.

12. The film structure according to claim 1, wherein said polyolefinic substrate is polypropylene.

* * * * *